(12) United States Patent
Jensen et al.

(10) Patent No.: US 8,615,765 B2
(45) Date of Patent: *Dec. 24, 2013

(54) DIVIDING A COMPUTER JOB INTO MICRO-JOBS

(75) Inventors: Craig Jensen, La Canada, CA (US);
Andrew Staffer, Sylmar, CA (US);
Basil Thomas, Sylmar, CA (US);
Richard Cadruvi, Simi Valley, CA (US)

(73) Assignee: Condusiv Technologies Corporation, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,885

(22) Filed: Nov. 2, 2011

(65) Prior Publication Data

US 2012/0054769 A1    Mar. 1, 2012

Related U.S. Application Data

(63) Continuation of application No. 11/546,072, filed on Oct. 10, 2006, now Pat. No. 8,056,083.

(51) Int. Cl.
*G06F 9/46*    (2006.01)
(52) U.S. Cl.
USPC .......................................... 718/104; 718/106
(58) Field of Classification Search
None
See application file for complete search history.

(56) References Cited

U.S. PATENT DOCUMENTS 5,675,790 A    10/1997    Walls
5,835,753 A *  11/1998    Witt .............................. 713/600
5,881,284 A    3/1999    Kubo
5,974,439 A    10/1999    Bollella
6,016,503 A    1/2000    Overby, Jr. et al.
6,226,728 B1   5/2001    See et al.
6,260,058 B1 * 7/2001    Hoenninger et al. ......... 718/107

(Continued)

FOREIGN PATENT DOCUMENTS

EP    0 880 139 A    11/1998
JP    2006-237348    8/1994

(Continued)

OTHER PUBLICATIONS

Russian Office Action received in Application No. 2008149050 dated May 30, 2011 (7 pages).

(Continued)

*Primary Examiner* — Camquy Truong
(74) *Attorney, Agent, or Firm* — Christie, Parker & Hale, LLP

(57) ABSTRACT

Computer micro-jobs are disclosed. A computer job is divided into micro-jobs. In one embodiment, the micro-jobs have a size that allows a particular micro-job to complete within an allotted time for which the particular micro-job owns a resource used to execute the micro-job. In one embodiment, the allotted time is a quantum. In one embodiment, an entire computer job is divided into micro-jobs and the computer job is then executed micro-job by micro-job until the entire computer job is complete. Each of the micro-jobs may complete its execution within its quantum, in one embodiment. In one embodiment, the execution of the micro-jobs is allocated to times when needed resources comply with one or more idleness criteria. A software program executed with micro-jobs may be run at all times while the computer is powered up without impacting the performance of other software programs running on the same computer system.

18 Claims, 4 Drawing Sheets

(56) References Cited

U.S. PATENT DOCUMENTS

| | | |
|---|---|---|
| 6,330,583 B1 | 12/2001 | Reiffin |
| 6,370,560 B1 * | 4/2002 | Robertazzi et al. ........... 718/105 |
| 6,591,287 B1 | 7/2003 | More et al. |
| 7,003,769 B1 | 2/2006 | Yoshimura et al. |
| 7,007,090 B1 | 2/2006 | Spangler et al. |
| 7,076,781 B2 | 7/2006 | Skovira |
| 7,451,704 B1 | 11/2008 | Gold et al. |
| 7,480,840 B2 | 1/2009 | Hathorn et al. |
| 7,814,485 B2 | 10/2010 | Morgan et al. |
| 7,853,948 B2 | 12/2010 | Berstis et al. |
| 7,987,466 B2 | 7/2011 | Nagamatsu et al. |
| 8,139,243 B2 * | 3/2012 | Isshiki et al. ................. 358/1.15 |
| 2001/0010065 A1 | 7/2001 | Chiba |
| 2001/0032293 A1 | 10/2001 | Korst et al. |
| 2003/0120778 A1 | 6/2003 | Chaboud et al. |
| 2003/0231630 A1 | 12/2003 | Messenger |
| 2004/0030882 A1 | 2/2004 | Forman |
| 2005/0060237 A1 | 3/2005 | Barsness et al. |
| 2005/0071841 A1 | 3/2005 | Hoflehner et al. |
| 2005/0073508 A1 | 4/2005 | Pittel |
| 2005/0125793 A1 | 6/2005 | Aguilar et al. |
| 2005/0240933 A1 | 10/2005 | Barsness et al. |
| 2005/0240934 A1 | 10/2005 | Patterson et al. |
| 2005/0246461 A1 | 11/2005 | Accapadi et al. |
| 2005/0268299 A1 | 12/2005 | Picinich et al. |
| 2006/0150190 A1 | 7/2006 | Gusler et al. |
| 2006/0277550 A1 | 12/2006 | Williams et al. |
| 2007/0094002 A1 | 4/2007 | Berstis et al. |
| 2007/0143759 A1 | 6/2007 | Ozgur et al. |
| 2007/0294695 A1 | 12/2007 | Jensen et al. |
| 2008/0005524 A1 | 1/2008 | Worrall |
| 2008/0086734 A1 | 4/2008 | Jensen et al. |
| 2011/0087657 A1 | 4/2011 | Jensen et al. |

FOREIGN PATENT DOCUMENTS

| | | |
|---|---|---|
| JP | 11-184714 | 7/1999 |
| JP | 2001-75832 | 3/2001 |
| JP | 2001-155084 | 6/2001 |
| JP | 2005-011023 | 1/2005 |
| KR | 10-2004-00962941 | 7/2004 |
| RU | 2018945 C1 | 8/1994 |
| RU | 849893 A1 | 1/1996 |
| RU | 2233470 C2 | 7/2004 |
| SU | 849 893 A1 | 1/1996 |
| WO | WO 00/70455 | 11/2000 |
| WO | WO 03/052590 A1 | 6/2003 |

OTHER PUBLICATIONS

Current Claims of Russian Application No. 2008149050 dated May 2011 (3 pages).
Chinese Office Action received in Application No. 200780022921.6 dated Aug. 24, 2011 (14 pages).
Current Claims of Chinese Application No. 200780022921.6 dated Aug. 2011 (3 pages).
European Office Action received in Application No. 08836059.9 dated Feb. 15, 2011 (8 pages).
Current Claims of European Application No. 08836059.9 dated Feb. 2011 (2 pages).
Australian Office Action received in Application No. 2008308549 dated Sep. 14, 2011 (3 pages).
Current Claims of Australian Application No. 2008308549 dated Sep. 2011 (3 pages).
Russian Office Action received in Application No. 2008149048 dated Jul. 8, 2011 (8 pages).
Current Claims of Russian Application No. 2008149048 dated Jul. 2011 (3 pages).
European Office Action received in Application No. 2008149048 dated Dec. 23, 2011 (8 pages).
Current Claims received in Application No. 2008149048 dated Dec. 2011 (2 pages).
Tiago, F. et al., "Scheduling Divisible Workloads Using the Adaptive Time Factoring Algorithm" XP019021392 dated 2005 (8 pages).
Albus, J., "Institute of Electrical and Electronics Engineers" XP000452711 dated Aug. 25, 1993 (3 pages).
Gerber R. et al., "Slicing real-time programs for enhanced schedulability" XP002457003 dated May 1997 (31 pages).
East IP Intellectual Property Services, Office Action in application No. 200780022921.6, dated Jul. 26, 2012, 6 pages.
Current Claims in application No. 200780022921.6, dated Jul. 2012, 2 pages.
Australian Government, "Patent Examination Report No. 1", in application No. 2007261607, 4 pages, dated Jul. 25, 2012.
Current Claims in application No. 2007261607, dated Jul. 2012, 6 pages.
Fukami Patent Office, Office Action, in application No. 2009-516502, dated Jun. 5, 2012, 6 pages.
Current Claims in application No. 2009-516502, dated Jun. 2012, 3 pages.
EPO office action for foreign patent application No. 07 777 432.1-2211, dated Oct. 28, 2009 (4 pages).
EPO office action for foreign patent application No. 07 777 320.8-2211, dated Oct. 28, 2009 (3 pages).
Fleege, P. et al., "Throttling Activity in a Multi-Tasking Operating System," Motorola, Inc. Technical Developments, Dec. 1, 1997, .ip.com Prior Art Database, Electronic Publication Jun. 13, 2002, pp. 72-74.
Parekh, S. et al., "Throttling Utilities in the IBM DB2 Universal Database Server," IBM Research Project, RC23163 (W0403-139), Mar. 23, 2004, IBM Research Division, Thomas J. Watson Research Center and IBM Toronto Laboratory, pp. 1-6.
Polychronopoulos, E. et al., "Kernel-Level Scheduling for the Nano-Threads Programming Model," 1998, High Performance Computing Archiecture Laboratory, Department of Computing Engineering and Informatics, University of Parnas, Greece and European Center for Parallelism of Barcelona, Department d'Arquitectura de Computadors, Universitat Politecnicz de Catalunya, Spain, pp. 337-344.
Hadjidoukas, P. et al., "A Portable Kernel-Mode Resource Manager on Windows 2000 Platforms" High Performance Information Systems Laboratory, Department of Computing Engineering and Informatics, University of Patras, Greece (7 pages).
Barekas, V. et al., "An OpenMP Implementation for Multiprogrammed SMPs", .hpclab.ceid.upatras.gr, (9 pages).
Ramamritham, K. et al., "Distributed Scheduling of Task with Deadlines and Resource Requirements," IEEE Transactions on Computers, vol. 38, No. 8, Aug. 1989 (pp. 1110-1123).
Regehr, J. "Hierarchical Loadable Schedulers," Apr. 27, 1999, .cs.utah.edu, (15 pages).
Engler, D. et al., "Exokernel: an operating system architecture for application-level resource management," Mar. 24, 1995, M.I.T. Laboratory for Computer Science, Cambridge, MA, USA (pp. 1-17).
Moreira, J., "Dynamic Resource Management on Distributed Systems Using Reconfigurable Applications," May 1997, IBM Journal of Resource and Development (23 pages).
Barham, P., "Devices in a Multi-Service Operating System," Jul. 1996, Churchill College, University of Cambridge, Ph.D. Dissertation (pp. i-ix and 1-131).
Notification of Transmittal of the International Search Report and the Written Opinion of the International Searching Authority, or the Declaration as received in International application No. PCT/US07/012746.
Kuhn, N. et al., "Task decomposition in dynamic agent societies," XP-002456556 (1993) *IEEE*, pp. 165-171.
Lifka, D., "The ANL/UMB SP scheduling system," XP-002456555 (1995) 8 pages.
Notification of Transmittal of the International Search Report and the Written Opinion of the International Searching Authority, or the Declaration as received in International application No. PCT/US07/013452.
Albus, J., "Task Decomposition," Proceedings of the 1993 *International Symposium on Intelligent Control* (1993), pp. 49-51.

(56) References Cited

OTHER PUBLICATIONS

Ferreto, T. et al., "Scheduling Divisable Workloads Using the Adaptive Time Factoring Algorithm" (2005) *Springer-Verlag Berlin Heiddelberg*, pp. 232-239.

Gerber, R., "Slicing Real-Time Programs for Enhanced Schedulability" XP-002457003 (1997), *ACM*, pp. 525-555.

Notification of Transmittal of the International Search Report and the Written Opinion of the International Searching Authority, or the Declaration as received in International application No. PCT/US07/013394, 13 pages.

Das, R. et al., "Towards Commercialization of Utility-based Resource Allocation" *IEEE* (2006) pp. 287-290.

Feitelson, D. et al., "Parallel Job Scheduling—a Status Report," XP-002456726, *Springer-Verlag Berlin Heidelberg* (2005) 16 pages.

Uttamchandani, S. et al., Chameleon: a self-evolving, fully-adaptive resource arbitrator for storage systems, XP-002456727, 14 pages.

Office Action, Russian Patent Application No. 2008149052, Applicant: Diskeeper, 3 pages, dated May 27, 2011.

Current Claims, Application No. 2008149052, Applicant Diskeeper, dated May 2011 (4 pages).

Office action issued in corresponding Korean patent application No. 10-2009-7000982, dated May 27, 2013, including English translation, 12pp.

Final Rejection mailed Apr. 2, 2013 for corresponding Japanese Patent Application No. 2009-516502, citing the references above, 6pp including English translation.

* cited by examiner

DIVIDING A COMPUTER JOB INTO MICRO-JOBS

BENEFIT CLAIMS; CROSS-REFERENCE TO RELATED APPLICATIONS

This application claims the benefit as a Continuation of application Ser. No. 11/546,072, filed Oct. 10, 2006, now U.S. Pat. No. 8,056,083, the entire content of which is hereby incorporated by reference as if fully set forth herein. This application is related to application Ser. No. 12/244,771, filed Oct. 3, 2008, now U.S. Pat. No. 8,086,819; to application Ser. No. 11/546,514, filed Oct. 10, 2006; and to application Ser. No. 11/471,466, filed Jun. 19, 2006, now U.S. Pat. No. 8,239,869; the entire contents of all of which are hereby incorporated by reference as if fully set forth herein.

The applicants hereby rescind any disclaimer of claim scope in the parent application(s) or the prosecution history thereof and advise the USPTO that the claims in this application may be broader than any claim in the parent application(s).

FIELD OF THE INVENTION

The present invention relates to executing software applications in a computer environment. In particular, embodiments of the present invention relate to dividing a computer or input-output job of an application into micro-jobs and executing the micro-jobs.

The applicant(s) hereby rescind any disclaimer of claim scope in the parent application(s) or the prosecution history thereof and advise the USPTO that the claims in this application may be broader than any claim in the parent application(s).

BACKGROUND

In many multi-tasking operating systems, processes are broken up into several threads. A thread is a piece of code executed by the operating system (O/S). The concept of multi-threading is to allow several pieces of code (or threads) in one process to run "concurrently." For example, if a word processor is running, the user can click on a "find menu item" to cause a pop-up box to appear. This pop-up can be moved and manipulated independent of the main word processor window. Thus, the pop-up does not render the main word processor window inactive. This is an example of two different threads running within the word processor process.

The concept of multi-tasking is similar to multi-threading in that it gives the appearance of multiple pieces of code executing at the same time on a single computer processor. A difference is that multi-tasking refers to more than one process running on the computer and multi-threading refers to more than one thread running within the same process as with the example above.

The appearance of more than one process or thread running concurrently is a result of a multi-tasking scheduler scheduling threads to run in very small time increments, which may be referred to as "quanta." A quantum is a time slice given to a thread during which time that thread owns a CPU resource. The length of a quantum is in the range of about 20 milliseconds to about 120 milliseconds on contemporary Operating Systems. The exact times may vary depending on the hardware on which the O/S is running. Further, the O/S can change the value of the quantum given to a particular thread. For example, if a thread does not complete during its first quantum, the O/S might increase or decrease the size of the quantum the next time the thread is scheduled to execute.

Due to the small length of a quantum compared to the human perception of time and by executing threads in a round robin fashion, it appears that threads run concurrently. Contemporary multi-tasking O/S schedulers add priorities to threads and various algorithms exist to optimally run the higher priority threads before the lower priority threads. However, all threads are presented to the O/S scheduler for immediate execution and the O/S scheduler to the best of its ability gets all the threads to complete their execution as fast as it can based on their priority.

However, a problem with scheduling in this manner is that computer performance is poorer than might be expected. Often, a process hesitates or even freezes. For example, a process that renders on a display screen based on user input is often unable to render as the user inputs data because another process is consuming too much processor time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
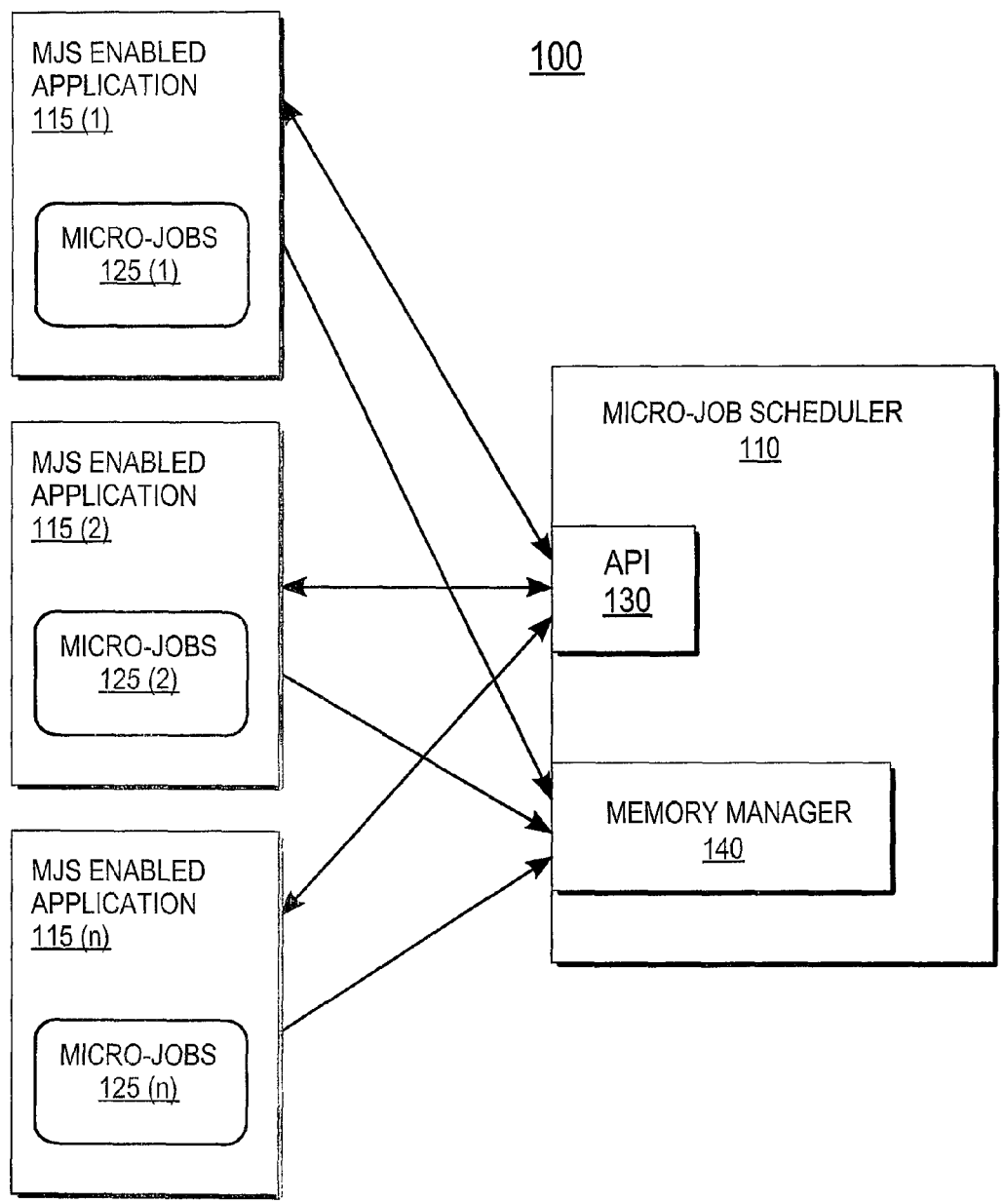
FIG. 1 is a diagram of an architecture for executing micro-jobs, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The majority of computers do not utilize all of their resource capacity 100% of the time. This is typically true even of computers that seemingly are in high use twenty-four hours a day, seven days a week, as well as computers that are only turned on for a portion of each day. Therefore, computer time and resources are wasted. For example, over a twenty-four hour period, a computer system that is used quite heavily, and which may have brief spikes in activity, may on average use only about five to twenty percent of its resources.

A method, system, and apparatus are disclosed herein to utilize these unused computer resources by dividing a computer job into micro-jobs. A micro-job may be a very small sliver of computer code (e.g., a relatively small number of instructions). In one embodiment, the size of a micro-job is such that it will finish execution within a time for which the micro-job was allocated a processing resource. For example, the number of operations in the micro-job is such that it will complete execution within a quantum, in one embodiment. A micro-job may be shorter in length than a quantum.

In one embodiment, an entire computer job is divided into micro-jobs and the computer job is then executed micro-job by micro-job until the entire computer job is complete. In contrast to attempting to run the computer job as quickly as possible given current resource constraints or to scheduling the job to run "off-hours" to avoid significantly impacting other jobs and applications, the computer job may be run on the computer on an ongoing basis, but in such minute pieces that it may be imperceptible to the user or other computer jobs. Thus, the job may be completely transparent to the user and to other jobs and applications. The user does not need to schedule the job; with this method it can be run at any time, including during performance-critical times.

In one embodiment, the micro-jobs are inserted for execution from time to time based on selected criteria. In one embodiment, the execution of the micro-jobs is spread out over time based on determining some time interval to space the micro-jobs out by. The time interval does not need to be the same between each of the micro-jobs. In one embodiment, the criterion for micro-job execution is based on resource availability. For example, in order to execute a micro-job, a determination is made as to whether one or more resources used by the micro-job comply with one or more idleness criteria. If the idleness criteria are met, the micro-job is executed.

Micro-Jobs

In one embodiment, the micro-jobs have a size that allows a particular micro-job to complete within an allotted time for which the particular micro-job owns a resource used to execute the processing job. In one embodiment, each micro-job is such a size that it will complete within its allotted time. However, it may be that some of the micro-jobs are too large to complete execution within their allotted time.

In one embodiment, the allotted time is a quantum. As previously discussed, a quantum is a time slice given to a portion of computer code (e.g., a thread) during which time that code portion owns the CPU resource. As also previously discussed, different operating systems used different quanta. Moreover, the quantum assigned to a particular code portion may change based on circumstances during runtime. For example, an O/S might increase or decrease the size of the quantum allotted to a thread. In one embodiment, the computer job is divided into micro-jobs based on the size of the quantum that is expected to be allocated to the computer job. In another embodiment, the computer job is divided into micro-jobs based on the size of the quantum that has been allocated to the computer job. The determination as to what portions of the computer job should be split off as micro-jobs may be made either prior to runtime or during runtime.

The micro-jobs are substantially smaller (for example, the smallest) work units that can be completed as a single unit while safely allowing for a pause in execution until the next micro-job executes, in accordance with one embodiment. By safely allowing for a pause in execution, it is meant that the execution of a particular micro-job can be delayed without affecting the outcome that results from execution of the all of the micro-jobs.

A micro-job may be a part of a thread. For example, a thread may be divided into multiple micro-jobs. These micro-jobs may be scheduled similar to how a thread is scheduled. However, as previously stated, a micro-job will complete its execution if allowed to execute for a quantum or other time period for which it owns a processing resource, in one embodiment.

A micro-job may only need a very small amount of resources (e.g., CPU time, memory allocation) at any one time. Such minimal use of resources at any one time may result in a stealthy process. Keeping the micro-jobs small allows the computer job to use only a small amount of computer resources at one time. Thus, execution of a micro-job consumes a sufficiently small amount of resources so as to not significantly impact performance of other applications in the computer system, in accordance with one embodiment of the present invention.

Dividing a Computer Job into Micro-Jobs

I) Application Divides its Computer Job into Micro-Jobs

An application program divides its computer jobs into a plurality of micro-jobs, in one embodiment. As used herein, the term plurality means any number greater than one. FIG. 1 is a diagram of an architecture 100 for executing micro-jobs, in accordance with an embodiment of the present invention. Each MJS-enabled application 115(1)-115(n) divides its computer job (or jobs) into micro-jobs 125 to execute. For example, an application programmer can place calls at appropriate locations in the application code that request permission from the MJS 110 to execute a micro-job 125, which, in effect, divides the computer job into micro-jobs 125. As examples, the computer job may perform maintenance such as backup, indexing, software updates, virus and malware scans, and defragmentation. However, the MJS-enabled application 115(1)-115(n) may also be software other than maintenance.

Still referring to FIG. 1, the micro-job scheduler (MJS) 110 determines when micro-jobs 125 can be executed. Applications that are enabled to work with an MJS are referred to herein as MJS-enabled applications 115. In this embodiment, the MJS 110 has an application program interface (API) 130 to allow a particular MJS-enabled application 115 (e.g., 115 (1)) to request that one or more micro-jobs 125 be allowed to execute. The API 130 also allows an MJS-enabled application 115 to specify by how much the micro-jobs 125 may be spread out, as will be discussed more fully below. An example API is included herein below. However, the architecture 100 is not limited to the example API.

In one embodiment, the MJS 110 maintains a micro-job queue, such that the MJS 110 can determine which micro-job 125 should be allowed to execute next. The execution of micro-jobs 125 is timed by the MJS 110 so as to have negligible impact on other applications.

The execution of the micro-jobs 125 can be specified by the MJS-enabled application 115 in an API call or other method of communication between the application and the MJS. When the scheduler 105 determines that the next micro-job 125 may execute without impacting other jobs, the MJS 110 responds to the MJS-enabled application 115 by instructing the MJS-enabled application 115(1) to execute the micro-job 125.

In one embodiment, computer resource utilization is monitored and analyzed to determine whether resource utilization complies with one or more idleness criteria. The MJS causes micro-jobs 125 to be executed when the one or more idleness criteria are satisfied. Since, in one embodiment, the time required for a particular micro-job 125 to execute is less than or equal to a quantum, any resources used by the micro-job 125 are relinquished before the resources are needed by another job. Thus, resource utilization by the micro-job 125 may go unnoticed and the micro-job 125 may be invisible to its application's environment. In one embodiment, the MJS schedules micro-jobs 125 based on time intervals. Time interval based scheduling is discussed below.

The MJS 110 also has a memory manager 140, in one embodiment. When the MJS 110 initializes, it is allocated memory by the operating system, some of which it uses for its own purposes and some of which it allocates to the MJS-enabled application 115. When an MJS-enabled application 115(1) launches, it requests a memory allocation from the MJS 110. The MJS 110 may determine how much memory to allocate to the MJS-enabled application 115(1) based on factors such as current computer system memory utilization by all processes and the needs of the MJS-enabled application 115(1). Memory requirements may be specific to each MJS-enabled application 115 and may be programmed into the MJS-enabled application 115 by a computer software programmer.

II) Scheduler Divides Computer Job into Micro-Jobs

Figure 2:
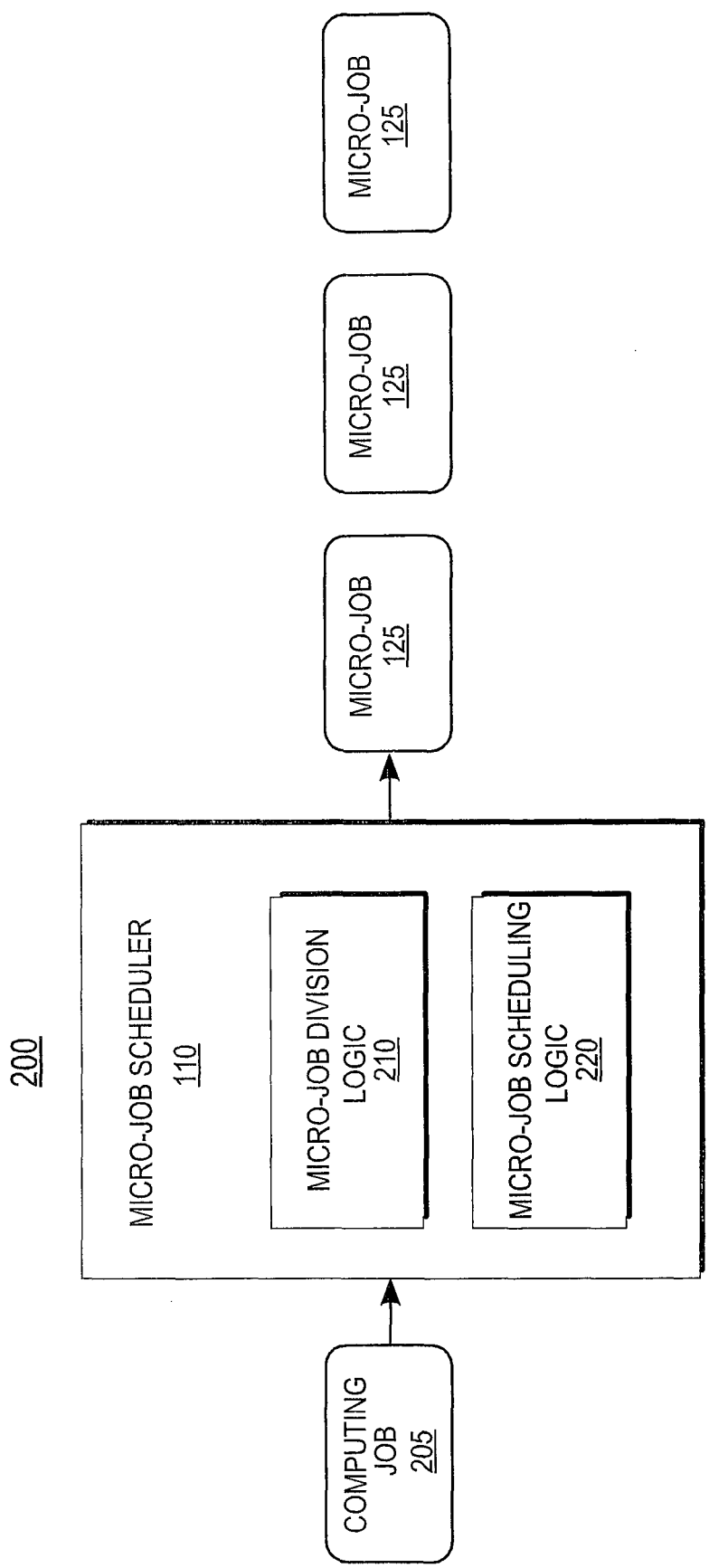
FIG. 2 is a diagram micro-scheduler that divides a computer job into micro-jobs, in accordance with an embodiment of the present invention.

In one embodiment, an MJS 110 divides a computer job into micro-jobs 125. Referring to FIG. 2, the MJS 110 has micro-job division logic 210, which divides the computer job 205 into micro-jobs 125. The MJS 110 also have micro-job scheduling logic 220, which schedules the micro-jobs 125 for execution. For example, the MJS 110 may work as a shell wrapped around application programs that are not MJS-enabled. Thus, in this example, the shell MJS 110 is a complete software application through which any executable can be run. Therefore, the shell MJS 110 automatically divides the computer job from the executable into micro-jobs 125, in one embodiment. In other words, the application programmer does not need to divide the application into micro-jobs 125, in this embodiment.

The shell MJS 110 divides the computer job from the executable into micro-jobs 125 based on resource utilization, in one embodiment. The shell MJS 110 may analyze the application and how the application runs to see what resources the application uses. For example, the shell MJS 110 analyzes what resources the application uses and to what degree the application uses the resources. For example, when a disk defragmenter runs, the shell MJS 110 can determine what resources the applications use (e.g., CPU, network, disk I/O). The shell MJS 110 automatically determines how to divide the application into micro-jobs 125 based on this analysis, in one embodiment. The shell MJS 110 may also determine how to schedule the micro-jobs 125, based on this analysis.

The shell MJS 110 may use various parameters to determine how to divide the computer job into micro-jobs 125 and/or determine how to schedule the micro-jobs 125 for execution. These parameters may be based on user input or established by the shell MJS 110. For example, the user may specify that a particular application have a high priority.

The shell MJS 110 schedules the micro-jobs 125 for execution based on time intervals, in one embodiment.

In one embodiment, the MJS 110 is part of an operating system. In this embodiment, the MJS 110 in the operating system may divide a computer job into micro-jobs 125.

Scheduling Micro-Jobs Based on Time Intervals

In one embodiment, micro-jobs 125 are executed based on time intervals. For example, the MJS 110 schedules micro-jobs 125 based on time intervals. For example, the MJS 110 spreads out execution of the micro-jobs 125 over time. For example, a computer job might take 12 minutes to complete if not divided into micro-jobs 125. However, if divided into micro-jobs 125, the execution of the entire computer job can be spread out over 24 hours, with each particular micro-job 125 executing once every few seconds.

As a particular example, if the quantum is 20 milliseconds the entire computer job might be completed in about 36,000 quanta. Thus, the computer job is divided into about 36,000 micro-jobs 125. The number of micro-jobs 125 might be slightly higher if some of the micro-jobs 125 are smaller than a quantum. Given, a 20 ms quantum, over a 24-hour period there are 4,320,000 quanta. Therefore, the MJS 110 could execute one of micro-jobs 125 every 120 quanta or every 2.4 seconds. In this particular example, the micro-job enabled application would take 24 hours to complete, but it may be undetectable even on extremely busy systems.

Scheduling Micro-Jobs Based on Events

In one embodiment, micro-jobs 125 are scheduled for execution based on events. For example, the MJS 110 schedules micro-jobs 125 based on a number of operations that occur. As another example, the MJS 110 schedules micro-jobs 125 based on a number of quanta that occur. The different quanta may be of different sizes. Thus, the MJS 110 spreads out execution of the micro-jobs 125 based on events, in one embodiment.

Resource-Based Scheduling of Micro-Jobs

In one embodiment, the micro-jobs 125 are scheduled based on resource utilization. For example, the MJS 110 is a resource-based scheduler, in one embodiment. For example, the MJS 110 schedules micro-jobs 125 such that the micro-jobs 125 utilize only idle resources. The MJS 110 determines whether resource utilization complies with one or more idleness criteria to make scheduling decisions. As an example, the MJS 110 may analyze disk activity. If an application other than the application with the micro-job 125 is using the disk, then the MJS 110 waits until the other application is done to schedule the micro-job 125. The MJS 110 continues to monitor the disk I/O utilization, and allows another micro-job 125 to be scheduled if no other application is seeking access to disk I/O. However, if another application seeks utilization of disk I/O, then the MJS 110 will not allow another micro-job 125 to be scheduled, wherein the other application can utilize the disk I/O.

As another example, the MJS 110 may analyze network activity. If network traffic is too high, the MJS 110 will not schedule any micro-jobs 125 until traffic slows. If network traffic is low enough, then the MJS 110 schedules a micro job for execution. The MJS 110 continues to check to make sure that network traffic stays low enough. If network traffic stays low enough, another micro-job 125 may be scheduled. However, if traffic gets too high, no further micro-jobs 125 are scheduled to execute.

The MJS 110 may make resource-based scheduling decisions based on any type of computer resource and any combination of resources. In one embodiment, the MJS 110 has multiple queues of micro-jobs 125 awaiting permission to execute. Each queue may correspond to a particular resource. For example, there may be a queue for micro-jobs 125 that need to utilize disk I/O, a queue for micro-jobs 125 that need to utilize a network, a queue for micro-jobs 125 that need to utilize a CPU, etc. There may also be one or more queues for micro-jobs 125 that utilize a combination of resources. The MJS 110 deploys micro-jobs 125 when the particular resource or combination of resources is available. A particular micro-job 125 might require the use of two resources. For example, the particular micro-job 125 might require use of a network resource and disk resource. However, the particular micro-job 125 does not need CPU resource. Even if the CPU resource utilization is currently high, the particular micro-job 125 can still be scheduled and executed.

The MJS-enabled application 115 sends parameters to the MJS 110 to control resource utilization, in accordance with an embodiment of the present invention. Control of resource utilization includes, but is not limited to, disk I/O, CPU and network. For example, the MJS-enabled application 115 can request a micro-job 125 be executed pending any combination of threshold levels of the above three resources. Moreover, the MJS-enabled application 115 can specify different resource threshold levels for different micro-jobs 125. For example, the MJS-enabled application 115 specifies a different resource threshold level with each micro-job 125, in accordance with one embodiment. Therefore, fine-grained resource management is possible. When the MJS 110 calculates resource utilization, it is the resource utilization of processes other than the MJS-enabled application 115 that is measured, in accordance with one embodiment of the present invention. The following example in which the CPU utilization threshold is set to 20 percent is used to illustrate. If CPU utilization is below 20 percent prior to allowing the MJS-enabled application 115 to execute, CPU utilization may increase to over 20 percent when the micro-job(s) execute. This increase beyond 20 percent is not considered a CPU resource utilization violation, in this example. Similar principles apply to network and disk I/O resources.

If the MJS 110 executes outside of the operating system, the MJS 110 self-limits in its own resource utilization, in one embodiment. For example, the MJS 110 monitors its own resource utilization and if its own resource utilization gets too high, the MJS 110 makes a request to the operating system to stop scheduling the MJS 110 for a period of time.

Process Flow

Figure 3:
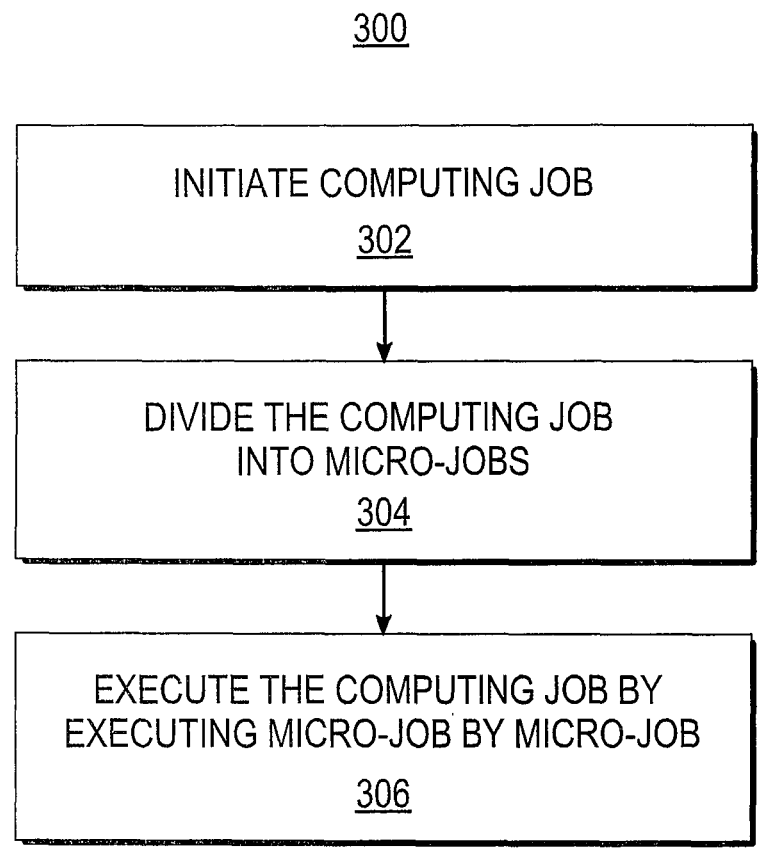
FIG. 3 is a flowchart illustrating steps of a process of dividing a computer job into micro-jobs, in accordance with an embodiment of the present invention.

FIG. 3 is a flowchart illustrating steps of a process 300 for executing a computer job by dividing the computer job into micro-jobs 125, in accordance with an embodiment of the present invention. In step 302, the computer job is initiated. The computer job may be from an MJS-enabled application 115. However, the computer job does not have to be associated with an MJS-enabled application 115.

As an example, in step 302, an MJS-enabled application 115 program is launched when the computer system is booted, in one embodiment. If the MJS-enabled application 115 does not have a computer job to perform, the MJS-enabled application 115 sits in an idle state until it has a computer job to run. In this idle state, the MJS-enabled application 115 may perform some functions such as occasional monitoring. At some point, the MJS-enabled application 115 has a computer job to perform, such as defragmenting a storage medium, or scanning for viruses. The computer job could be to defragment a single disk and the files stored on it, wherein the MJS-enabled application 115 defragments that disk on an ongoing basis.

A small amount of memory may be allocated to the MJS-enabled application 115 when it is launched. The amount that is allocated can be very small because the MJS-enabled application 115 typically only attempts to execute a single micro-job 125 at one time. However, in some cases, the MJS-enabled application 115 might attempt to execute multiple micro-jobs 125 without waiting for other processes to execute. For example, if the MJS 110 determines that the required computer system resources are idle, the MJS 110 may allow the MJS-enabled application 115 to execute multiple micro-jobs 125 in a row without another process utilizing the resources that are utilized by the micro-jobs 125.

In step 304, the computer job is divided into micro-jobs 125. The size of a particular micro-job 125 allows the particular micro-job 125 to complete within an allotted time for which the particular micro-job 125 owns a resource used to execute the processing job, in one embodiment. The micro-jobs 125 may be of a size such that execution of the micro-jobs 125 utilizes a sufficiently small amount of resources so as to not significantly impact performance of other jobs in the computer system. In one embodiment, dividing the computer job into micro-jobs 125 comprises selecting the size of the micro-jobs 125 such that each micro job 125 is able to complete execution within an allotted time for which the computer job is given ownership of a resource used to execute the micro job 125.

In one embodiment, the computer job is divided into micro-jobs 125 by an application that owns the computer job. Dividing the computer job into micro-jobs 125 may be accomplished by instructions within an MJS-enabled application 115. In general, these instructions are decision points in the MJS-enabled application 115. For example, the instructions can be API calls to the MJS 110 that request permission to execute a micro-job 125. However, the MJS 110 can be integrated with the MJS-enabled application 115, in which case the instructions could be calls to a scheduling function within the MJS-enabled application 115. Other techniques might be used to divide the computer job into micro-jobs 125. For example, in one embodiment, the computer job is divided into micro-jobs 125 by micro-job division logic in a shell MJS 110.

Step 306 is execution of the micro-jobs 125. In one embodiment, the entire computer job is divided into micro-jobs 125 and the computer job is then executed micro-job 125 by micro-job 125 until the entire computer job is complete. For example, an entire defragmentation job is divided into micro-jobs 125, which are executed one at a time until the entire defragmentation job is complete. A particular micro job 125 completes its execution in less than or equal to the allotted time, in one embodiment.

Executing micro-job 125 by micro-job 125 is not limited to sequential one-by-one execution, although it includes sequential one-by-one execution. Multiple micro-jobs 125 could be executed at the same time. For example, if there are multiple CPUs, different micro-jobs 125 could execute on different CPUs at the same time.

In one embodiment, the scheduling of the micro-jobs 125 is based on resource utilization. In this embodiment, a determination is made, for each of the micro-jobs 125, as to whether utilization of one or more resources of the computer system to be used by the particular micro-job 125 satisfies one or more idleness criteria. The idleness criteria for a particular resource may be based on one or more factors. For example, CPU utilization is used as an idleness criterion for CPU resource utilization, in one embodiment. Thus, the micro-jobs 125 are only executed at times when the resources of the computer system needed by the micro-jobs 125 are sufficiently idle. The idleness criteria are based on resource thresholds, in one embodiment. For example, resource thresholds may be used, wherein a micro-job 125 of an MJS-enabled application 115 only executes if resource utilization by other processes is below a threshold specified by the MJS-enabled application 115. The example API described below contains one example of some resource threshold parameters. However, process 300 is not limited to these resource threshold parameters.

In one embodiment, the scheduling of the micro-jobs 125 is based on time intervals. In one embodiment, the execution of the computer job is spread over a period of time. For example, the computer job might be spread out over several hours. Based on how many micro-jobs 125 into which the computer job is divided, a determination can be made as to how to spread the micro-jobs 125 out over time. The time between successive micro-jobs 125 does not need to be uniform.

In one embodiment, an application program that initiated the computer job runs on an on-going basis, continuing to run as long as the computer system remains booted, but remains idle while no work needs to be performed. For example, a disk defragmenter to virus detection application program continues to run. Thus, even if the computer job completes, the application program continues to run in idle mode waiting for the next segment of work. Thus, the application program does not need to be re-launched when it has another computer job to perform. As a result, the application program does not consume additional resources that are typical of launching an application program. When the application program determines that it has another computer job to do, the computer job is divided into micro-jobs 125, and the micro-jobs 125 are executed over time. For example, a disk defragmenter application program may determine that additional storage medium defragmentation should be done based on changes to the computer's storage medium.

Example API

An embodiment of the present invention is an API for allowing an MJS-enabled application 115 to interface with an MJS 110. The example API has the following resource threshold parameters for CPU, disk, and network.

CPU Utilization threshold
Pending Disk I/O Count threshold
Network Utilization threshold The above parameters can be specified for each micro-job 125. In other words, different micro-jobs 125 can be assigned different resource threshold parameters. For example, for a micro-job 125 that uses the network, a network threshold may be used. However, the network threshold could be zero for micro-jobs 125 that do not use the network. Thus, fine-grained resource management is provided for, in accordance with an embodiment of the present invention.

As a particular example, the MJS-enabled application 115 can request that a particular micro-job 125 be executed only if the CPU utilization is below 50%, and the I/O Disk Utilization is below 40%, and network traffic is below 60%. Any combination of the resource threshold factors can be used, including none at all. The CPU utilization threshold differentiates between MJS's use of the CPU as opposed to that of any other job, in accordance with an embodiment of the present invention.

The following two parameters are used to specify how frequently resource utilization should be measured.

CPU Utilization Window
Network Utilization Window

The CPU Utilization Window parameter defines a time window over which CPU utilization is calculated. For example, CPU utilization over the last n milliseconds is averaged. The network utilization window defines a time window over which network utilization is calculated. These parameters may be internal to the MJS 110. However, an MJS-enabled application 115 may override these parameters. The pending disk I/O is absolute at any point in time and thus it does not have to be calculated.

A mandatory idle time parameter may be passed from the MJS-enabled application 115 to the MJS to control how the micro-jobs 125 are spread out over time. The mandatory idle time parameter is optional. Furthermore, when used, the mandatory idle parameter may have a value of zero.

Mandatory Idle Time

The MJS 110 keeps track of "idle time," which is defined as system idle time after all micro-jobs 125 have executed. As previously mentioned, MJS-enabled application 115(s) can queue up micro-jobs 125 with the MJS 110. When there are no micro-jobs 125 on the MJS queue, the MJS 110 waits for the specified Mandatory Idle Time and then wakes up and authorizes the MJS-enabled application 115(s) to perform additional work. For example, an MJS-enabled defragmenter might first execute a number of micro-jobs 125 to defragment a disk drive, and then be paused by the MJS 110. After the specified Mandatory Idle Time, the MJS 110 calls the MJS-enabled defragmenter to authorize additional work. For example, the MJS-enabled defragmenter might execute a clean-up job, such as releasing memory. Mandatory Idle Time can be a default parameter that can be adjusted by an MJS-enabled application 115.

The following parameters relate to waiting to execute a micro-job 125 when resource utilization is above a threshold.

Wait Time
Maximum Wait Time

If the MJS 110 determines that resource utilization is currently too high to execute a micro-job, the MJS 110 waits for the specified Wait Time and then re-checks resource utilization. The Wait Time parameter can be increased each time the MJS 110 determines that resource utilization is too high. For example, the MJS 110 can increase the Wait Time parameter until the Max Wait Time is reached. These parameters can be specified by the MJS-enabled application 115 when it is first started. An MJS-enabled application 115 can adjust these parameters during its run time.

Hardware Overview

Figure 4:
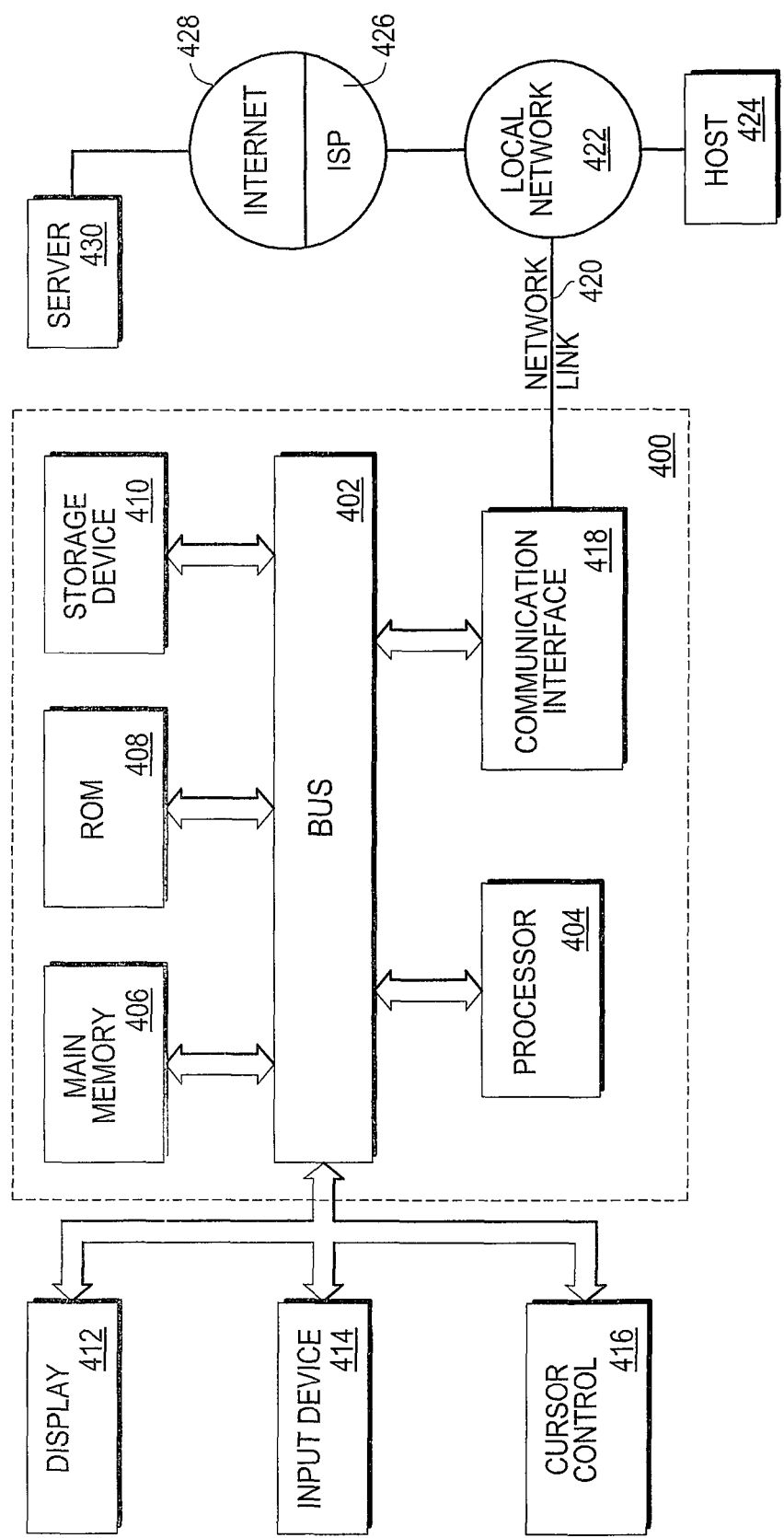
FIG. 4 is a block diagram that illustrates a computer system upon which an embodiment of the invention may be implemented.

FIG. 4 is a block diagram that illustrates a computer system 400 upon which an embodiment of the invention may be implemented. Steps of process 300 are stored as instructions one or more of the computer-readable media of system 400 and executed on the processor of computer system 400. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. The computer system 400 can have any number of processors 404. For example, computer system 400 is a multi-processor system, in one embodiment. The processor 404 can have any number of cores. In one embodiment, the processor 404 is a multi-core processor 404. Computer system 400 can be used in a hyper-threaded machine.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for execution of a computer job, the method comprising:
   dividing the computer job into a plurality of micro-jobs based on resource utilization and prior to allocating a time-slice for which a first micro-job of the plurality of micro-jobs is given ownership of a resource;
   wherein dividing the computer job comprises selecting a size of the first micro-job based, at least in part, on a duration of time-slices that are being allocated to the plurality of micro-jobs for use of the resource; and
   causing execution of the first micro-job on the resource to be completed within the time-slice;
   executing, by an operating system, the computer job in a first amount of time by executing each of the plurality of micro-jobs;
   wherein the computer job is a computer job which, if executed by the operating system without being divided, would have been executed by the operating system in a second amount of time that is different than the first amount of time, and wherein the method is executed by one or more devices.

2. The method as recited in claim 1, wherein the computer job is divided into the plurality of micro-jobs, based on the duration of time-slices that are being allocated to threads for use of the resource, prior to a runtime of the computer job.

3. The method as recited in claim 1, wherein the computer job is divided into the plurality of micro jobs by an operating system to which the computer job is submitted for execution.

4. The method as recited in claim 1, further comprising:
   waiting a first time interval after execution of the first micro-job to execute a second micro-job of the plurality of micro-jobs.

5. The method as recited in claim 1, further comprising allocating, by an operating system, the time-slice for which the first micro-job is given ownership of the resource.

6. The method as recited in claim 1, wherein the computer job is divided into the plurality of micro-jobs by a program that is separate from an operating system to which the computer job is submitted for execution.

7. A non-transitory computer-readable storage medium for execution of a computer job and storing one or more sequences of instructions which, when executed by one or more processors, causes the one or more processors to perform steps comprising:
   dividing the computer job into a plurality of micro-jobs based on resource utilization and prior to allocating a time-slice for which a first micro-job, of the plurality of micro-jobs, is given ownership of a resource;
   wherein dividing the computer job comprises selecting a size of the first micro-job based, at least in part, on a duration of time-slices that are being allocated to the plurality of micro-jobs for use of the resource; and
   causing execution of the first micro-job on the resource to be completed within the time-slice;
   executing, by an operating system, the computer job in a first amount of time by: executing each of the plurality of micro-jobs; and
   wherein the computer job is a computer job which, if executed by the operating system without being divided, would have been executed by the operating system in a second amount of time that is different than the first amount of time.

8. The computer-readable storage medium as recited in claim 7, wherein the computer job is divided into the plurality of micro-jobs, based on the duration of time-slices that are being allocated to threads for use of the resource, prior to a runtime of the computer job.

9. The computer-readable storage medium as recited in claim 7, wherein the computer job is divided into the plurality of micro jobs by an operating system to which the computer job is submitted for execution.

10. The computer-readable storage medium as recited in claim 7, wherein the steps further comprise:
    waiting a first time interval after execution of the first micro-job to execute a second micro-job of the plurality of micro-jobs.

11. The computer-readable storage medium as recited in claim 7, wherein the steps further comprise allocating, by an operating system, the time-slice for which the first micro job is given ownership of the resource.

12. The computer-readable storage medium as recited in claim 7, wherein the computer job is divided into the plurality of micro jobs by a program that is separate from an operating system to which the computer job is submitted for execution.

13. A system for execution of a computer job, comprising:
    one or more processors; and
    a computer-readable storage medium communicatively coupled to the one or more computer processors;
    wherein the computer-readable medium comprises instructions which, when executed by the one or more processors, causes performance of steps comprising:
    dividing the computer job into a plurality of micro-jobs based on resource utilization and prior to allocating a time-slice for which a first micro-job, of the plurality of micro-jobs, is given ownership of a resource;
    wherein dividing the computer job comprises selecting a size of the first micro-job based, at least in part, on a duration of time-slices that are being allocated to the plurality of micro-jobs for use of the resource;
    causing execution of the first micro-job on the resource to be completed within the time-slice;
    wherein the steps further comprise:
    executing, by an operating system, the computer job in a first amount of time by executing each of the plurality of micro-jobs; and
    wherein the computer job is a computer job which, if executed by the operating system without being divided, would have been executed by the operating system in a second amount of time that is different than the first amount of time.

14. The system as recited in claim 13, wherein the computer job is divided into the plurality of micro-jobs, based on the duration of time-slices that are being allocated to threads for use of the resource, prior to a runtime of the computer job.

15. The system as recited in claim 13, wherein the computer job is divided into the plurality of micro-jobs by an operating system to which the computer job is submitted for execution.

16. The system as recited in claim 13, wherein the steps further comprise:
    waiting a first time interval after execution of the first micro-job to execute a second micro-job of the plurality of micro-jobs.

17. The system as recited in claim 13, wherein the steps further comprise allocating, by an operating system, the time-slice for which the first micro job is given ownership of the resource.

18. The system as recited in claim 13, wherein the computer job is divided into the plurality of micro jobs by a program that is separate from an operating system to which the computer job is submitted for execution.

* * * * *